United States Patent
Dremonas

(10) Patent No.: US 11,557,298 B1
(45) Date of Patent: *Jan. 17, 2023

(54) SPEECH RECOGNITION TECHNOLOGY TO IMPROVE RETAIL STORE CHECKOUT

(71) Applicant: PROJECT 4011, LLC, Chicago, IL (US)

(72) Inventor: Stephanie Dremonas, Chicago, IL (US)

(73) Assignee: PROJECT 4011, LLC

( * ) Notice: Subject to any disclaimer, the term of this patent is extended or adjusted under 35 U.S.C. 154(b) by 209 days.

This patent is subject to a terminal disclaimer.

(21) Appl. No.: 16/866,352

(22) Filed: May 4, 2020

Related U.S. Application Data

(63) Continuation of application No. 15/613,927, filed on Jun. 5, 2017, now Pat. No. 10,643,618.

(51) Int. Cl.
- *G10L 15/26* (2006.01)
- *G10L 17/14* (2013.01)
- *G06F 3/041* (2006.01)
- *A47F 9/04* (2006.01)

(52) U.S. Cl.
CPC ............ *G10L 15/26* (2013.01); *A47F 9/046* (2013.01); *G06F 3/0412* (2013.01); *G10L 17/14* (2013.01)

(58) Field of Classification Search
CPC ....... G10L 15/22; G10L 15/265; G10L 15/26; G10L 17/14; G06F 3/167; G06F 3/0412; H04M 2201/40; A47F 9/046
See application file for complete search history.

(56) References Cited

U.S. PATENT DOCUMENTS

| | | |
|---|---|---|
| 5,426,282 A | 6/1995 | Humble |
| 5,839,104 A | 11/1998 | Miller et al. |
| 6,873,951 B1 | 3/2005 | Lin et al. |
| 7,383,200 B1 | 6/2008 | Walker et al. |
| 7,593,873 B1 | 9/2009 | Oakes, III |
| 7,912,751 B1 | 3/2011 | Allos |
| 8,825,531 B1 | 9/2014 | Catoe |
| 10,643,618 B1 * | 5/2020 | Dremonas ............... G10L 17/14 |
| 2002/0186133 A1 | 12/2002 | Loof |
| 2002/0194074 A1 | 12/2002 | Jacobs |
| 2003/0018531 A1 | 1/2003 | Mahaffy et al. |
| 2003/0018897 A1 | 1/2003 | Bellis et al. |

(Continued)

OTHER PUBLICATIONS

Paleofuture.gizmodo.com, "Forget Barcodes, 1961's Cash Register of the Future Understood Speech," May 23, 2013. Retrieved from the Internet on Sep. 6, 2017: https://paleofuture.gizmodo.com/forget-barcodes-1961 s-cash-register-of-the-future-und-509145222.

*Primary Examiner* — Jesse S Pullias

(74) *Attorney, Agent, or Firm* — Marshall, Gerstein & Borun LLP

(57) ABSTRACT

Systems and methods for using speech recognition technologies to facilitate retail store checkout are disclosed. According to certain aspects, an electronic device may detect a user's speech and analyze the speech to identify a set of matching items that may correspond to items being purchased by a customer. The electronic device may display, via a user interface, the set of matching items as well as a code or identification associated with the set of matching items. The user may interface with a point of sale system to input a code for a desired item, and the point of sale system may add the desired item to an order and may facilitate a checkout for the order.

20 Claims, 6 Drawing Sheets

(56) References Cited

U.S. PATENT DOCUMENTS

| | | |
|---|---|---|
| 2007/0057774 A1 | 3/2007 | Kawamata |
| 2010/0306080 A1 | 12/2010 | Trandal et al. |
| 2012/0284130 A1 | 11/2012 | Lewis et al. |
| 2013/0054390 A1* | 2/2013 | Kerchner ............. G07G 1/0045 705/17 |
| 2013/0332319 A1 | 12/2013 | Zuber |
| 2014/0012657 A1* | 1/2014 | Begum ............. G06Q 30/0239 705/14.39 |
| 2015/0025969 A1 | 1/2015 | Schroll et al. |

\* cited by examiner

SPEECH RECOGNITION TECHNOLOGY TO IMPROVE RETAIL STORE CHECKOUT

CROSS-REFERENCE TO RELATED APPLICATIONS

The application is a continuation of U.S. patent application Ser. No. 15/613,927, filed Jun. 5, 2017, and incorporated by reference herein in its entirety.

FIELD

The present disclosure is directed to speech recognition technologies. In particular, the present disclosure is directed to systems and methods for implementing speech recognition technologies in electronic devices to improve retail store checkout.

BACKGROUND

Retail stores, such as grocery stores and other types of stores, offer a number of products, services, and items for purchase by customers. Typically, a customer will choose which items he or she wishes to purchase, and proceed to a point of sale system (POS) where an associate or employee of the retail store (e.g., a cashier), or self-checkout system, will facilitate a checkout for the chosen items. Although many items include codes on their packaging (e.g., UPCs or other barcodes) that may be read or detected by a scanner, many other items, including unpackaged items, do not include codes that may be read or detected. In a grocery store, for example, produce and fresh bakery items include an associated a price look-up (PLU) code that must be manually input into a POS system.

Although some items may have the PLU affixed thereon, many items are absent a PLU, and the cashier is therefore responsible for identifying the correct PLU for an item and inputting the PLU into the POS system. However, it is difficult to memorize the numerous PLUs for the numerous items offered for sale by a retail store, and errors and inefficiencies may result. Additionally, retail stores typically face high turnover rates for cashiers, and training new cashiers on PLU codes is expensive and time-consuming.

Accordingly, there is an opportunity to implement speech recognition technologies in POS systems to enable retail store individuals (e.g., cashiers) to effectively and efficiently handle item checkouts in retail stores, especially high-volume and high-frequency checkouts that often include many unpackaged items.

SUMMARY

In an embodiment, a computer-implemented method in an electronic device of facilitating a checkout for items to be purchased is provided. The method may include receiving, via a microphone, a set of audio data annunciated by a user of the electronic device; analyzing, by a processor, the set of audio data to identify a set of keywords included in the set of audio data; determining, based on the set of keywords included in the set of audio data, a set of matching items; presenting the set of matching items via a user interface of the electronic device; receiving a selection of at least one matching item of the set of matching items; and transmitting, to a point of sale system, an indication of the at least one matching item, wherein the point of sale system processes a checkout of an order that includes at least the at least one matching item.

In another embodiment, an electronic device for facilitating a checkout for items to be purchased is provided. The electronic device may include a memory storing a set of computer-executable instructions, a user interface, a transceiver configured to communicate with a point of sale system via a network connection, and a processor interfacing with the memory, the user interface, and the transceiver. The processor may be configured to execute the set of computer-executable instructions to cause the processor to: receive, via a microphone, a set of audio data annunciated by a user of the electronic device, analyze the set of audio data to identify a set of keywords included in the set of audio data, determine, based on the set of keywords included in the set of audio data, a set of matching items, cause the user interface to present the set of matching items, receive a selection of at least one matching item of the set of matching items, and transmit, to the point of sale system via the transceiver, an indication of the at least one matching item, wherein the point of sale system processes a checkout of an order that includes at least the at least one matching item.

In another embodiment, a system for facilitating a checkout for items to be purchased is provided. The system may include a mobile device comprising: a first memory storing a first set of computer-executable instructions, a user interface, and a first processor interfacing with the first memory and the user interface. The first processor may be configured to execute the first set of computer-executable instructions to cause the first processor to receive a set of audio data via a microphone, analyze the set of audio data to identify a set of keywords included in the set of audio data, determine, based on the set of keywords included in the set of audio data, a set of matching items, and cause the user interface to present (i) the set of matching items, and (ii) a set of codes respectively associated with the set of matching items. The system may further include a point of sale device comprising: a second memory storing a second set of computer-executable instructions, and a second processor interfacing with the second memory. The second processor may be configured to execute the second set of computer-executable instructions to cause the second processor to receive at least one code of the set of codes respectively corresponding to at least one matching item of the set of matching items, and process a checkout of an order that includes the at least one matching item.

In a further embodiment, an electronic device for facilitating a checkout for items to be purchased is provided. The electronic device may include a memory storing a set of computer-executable instructions, a user interface, and a processor interfacing with the memory and the user interface, and configured to execute the set of computer-executable instructions to cause the processor to: cause the user interface to present a set of training words, receive, via a microphone, a set of training audio data representing the set of training words annunciated by a user of the electronic device, based on the set of training audio data, establish a baseline speech pattern associated with the user, receive, via the microphone, a set of audio data annunciated by the user, analyze the set of audio data to identify a set of keywords included in the set of audio data, determine, based on the set of keywords included in the set of audio data, a set of matching items, and cause the user interface to present the set of matching items.

DETAILED DESCRIPTION

Figure 1:
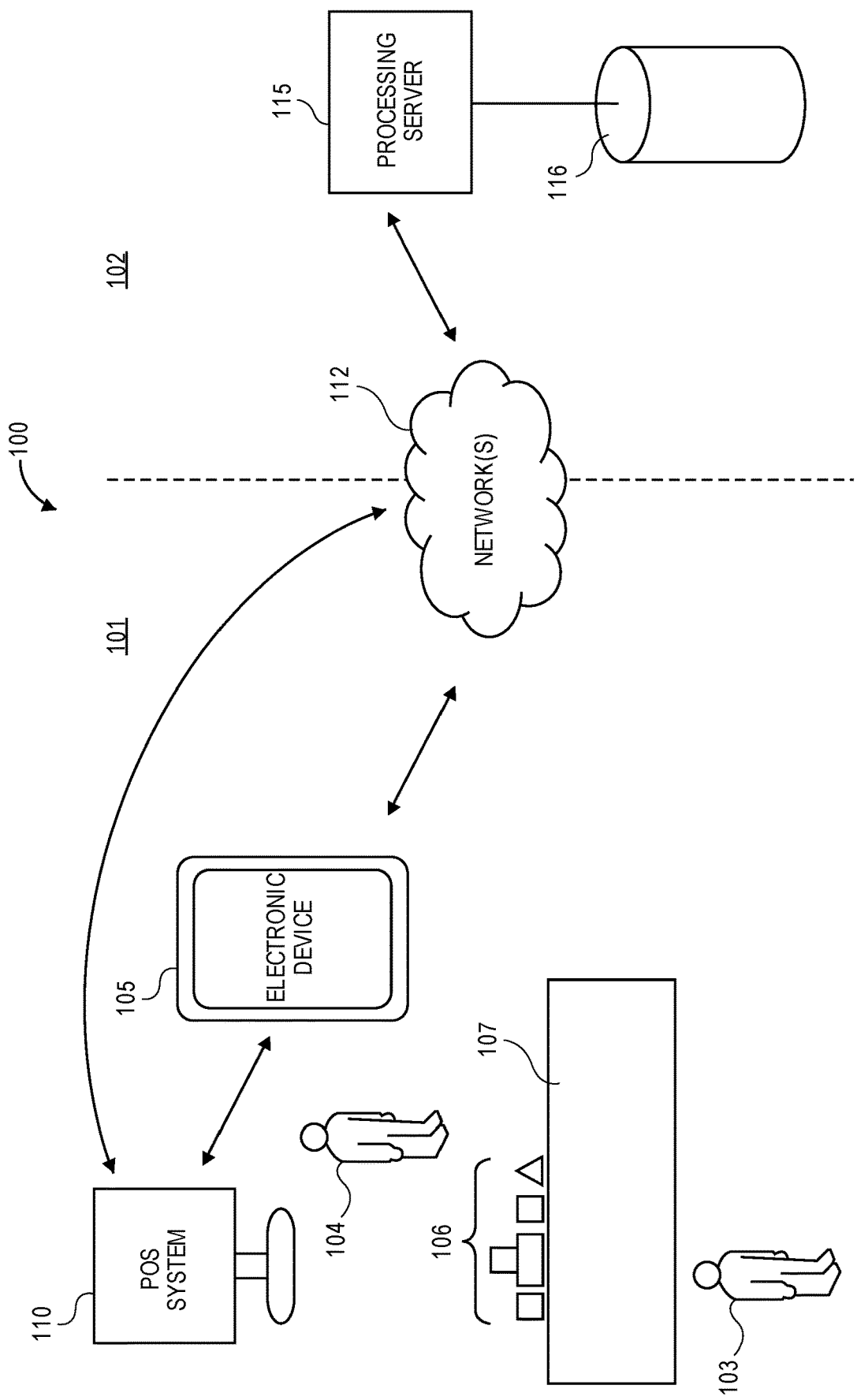
FIG. 1 depicts an overview of components and entities associated with the systems and methods, in accordance with some embodiments.

The present embodiments may relate to, inter alia, implementing speech recognition technologies in electronic components associated with a retail store checkout. According to certain aspects, an individual associated with a retail store (e.g., a cashier) may dictate or annunciate items included in a checkout order of a customer, where an electronic device may detect the individual's voice in the form of audio data, identify a set of keywords included in the audio data, and determine a set of items that match the set of keywords. Further, the electronic device may indicate, via a user interface, the set of items and identifying information (e.g., a set of PLUs) related thereto for review by the individual. The individual may input or otherwise cause the identifying information of an item to be communicated to a POS system so that the POS system may add the item to the checkout order of the customer.

The systems and methods therefore offer numerous benefits. In particular, the systems and methods improve how codes such as PLUs are identified and input into a POS system. Further, the systems and methods reduce the need for cashiers to memorize item codes such as PLUs, which may reduce the expenses and time associated with cashier training and result in lower cashier turnover. For example, the systems and methods may reduce the amount of time needed to train cashiers by a significant amount, thus reducing costs and enabling retail stores to offer more competitive or above-market wages. Additionally, the systems and methods improve the checkout experience for customers, as cashiers do not need to manually access charts or guides that list codes such as PLUs. It should be appreciated that additional benefits are envisioned.

The systems and methods discussed herein address a challenge that is particular to managing retail store checkouts. In particular, the challenge relates to a difficulty in effectively and efficiently facilitating customer checkouts in retail stores. Conventionally, retail store cashiers either memorize or manually look up codes associated with unmarked and/or unpackaged items. However, memorization and manual lookup is time-consuming, frustrating, and challenging, especially in retail stores having high-volume and high-frequency checkouts. The systems and methods offer improved capabilities to solve these problems by utilizing speech recognition technologies that analyze cashier speech to determine items included in checkout orders. The systems and methods enable the POS system to receive identifications of the items so that the POS system may effectively and efficiently add the items to the corresponding orders. Further, because the systems and methods employ the capture, analysis, and transmission of data between and among multiple devices, the systems and methods are necessarily rooted in computer technology in order to overcome the noted shortcomings that specifically arise in the realm of managing retail store checkouts.

According to implementations, the systems and methods may support a dynamic, real-time or near-real-time communication, analysis, and processing of data. In particular, the systems and methods may analyze detected audio data in real-time or near real-time, automatically and dynamically display matching items in real-time or near real-time, and facilitate checkout functionalities in real-time or near-real-time.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of front-end components 101 and a set of back-end components 102. In embodiments, the set of front-end components 101 may be located in or otherwise associated with a retail store, shop, place of business, or the like (as used herein "retail store"), and the set of back-end components 102 may be associated with the retail store and located remotely from the retail store. In an implementation, the back-end components 102 may be located within the retail store. The retail store may offer a set of items, products, services, or the like (as used herein, "items") that may be selected and purchased by customers, patrons, users, or the like (as used herein, "customers") of the retail store.

The set of front-end components 101 may be used or interfaced by a user 103 and a user 104. In embodiments, the user 103 may be a customer of the retail store and the user 104 may be an employee, contractor, volunteer, or other individual associated with the retail store. As described herein, the user 104 may be a cashier who may be responsible for facilitating checkout processes with customers, however it should be appreciated that the user 104 may have alternative or additional responsibilities.

Generally, the user 103 may select a set of items 106 for purchase from the retail store. The set of front-end components 101 may include a checkout lane 107 or similar area to which the user 103 may bring the set of items 106 for checkout. The user 104 may assist or help the user 103 complete the checkout of the set of items 106. Although the embodiments are described as including the user 104, it should be appreciated that the user 103 (e.g., a customer) may facilitate a self-checkout from the checkout lane 107 without involvement of the user 104. In this scenario, the user 103 may perform the actions otherwise reserved for the user 104.

The front-end components 101 may further include an electronic device 105 and a POS system 110 that the user 104 may use or interface with to facilitate the checkout of the set of items 106. Although FIG. 1 depicts the electronic device 105 and POS system 110 as separate components, it should be appreciated that the electronic device 105 and POS system 110 may be combined into a single electronic device.

The electronic device 105 may be any type of electronic device such as a mobile device (e.g., a smartphone), notebook or desktop computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Similarly, the POS system 110 may be an electronic device or combination of electronic components, such as a mobile device (e.g., a smartphone), notebook or desktop computer, tablet, phablet, PDA (personal digital assistant), computing device configured for wireless communication, and/or the like. Additionally or alternatively, the POS system 110 may include a display component with a user interface (e.g., a monitor), and may support a combination of hardware and software components.

According to embodiments, each of the electronic device 105 and the POS system 110 may be configured with a user interface (e.g., a touchscreen, monitor, or other user interface), configured to connect to one or more peripheral components (e.g., keyboard, mouse, external speaker, external microphone), and/or configured with built-in audio components (e.g., speaker, microphone). Additionally, each of the electronic device 105 and the POS system 110 may be configured to execute a set of applications that may facilitate the functionalities of the systems and methods.

The electronic device 105 and the POS system 110 may be configured to directly connect and/or communicate with each other via a network connection 112, where the network connection 112 may be any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). In an embodiment, the network connection 112 may support a short-range communication such as NFC, RFID, and/or the like.

As illustrated in FIG. 1, the back-end components 102 may include a processing server 115 and storage 116, where one or both of the electronic device 105 and the POS system 110 may be configured to communicate with the processing server 115 via the one or more networks 112. The processing server 115 may be associated with the retail store, and optionally with additional location(s) of the retail store. In embodiments, the network(s) 112 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The processing server 115 may be configured to interface with or support the storage 116 capable of storing various data. In one implementation, the storage 116 may include a database that stores information related to items for sale in the retail store. In embodiments, the processing server 115 may be located at or within the retail store, or may be located remote from the retail store (i.e., the processing server 115 may be cloud-based).

The processing server 115 may be configured to maintain information associated with an inventory of items in the retail store, where the information may represent real-time or near real-time inventory information, and where the storage 116 may store the information. The processing server 115 may update the information with any received item information, such as if a shipment of items is received. The processing server 115 may be configured to communicate, via the network(s) 112, any portion of the information to one or both of the POS system 110 and the electronic device 105, such as in response to a request, periodically, or when updated information is received. According to embodiments, the information may include identifications of items (e.g., a UPC or PLU), descriptions of items, images of items, pricing information, inventory information, locations of the items within the retail store, and/or other information. It should be appreciated that either or both of the POS system 110 and electronic device 105 may similarly maintain inventory information.

The retail store may support a portal, application, or the like, that may interface with the processing server 115 to import or update item or product information, such as pricing, new or existing item availability, inventory, images, descriptions, locations within the retail store, and/or other information. In this regard, the processing server 115 may support and manage item information for a plurality of retail stores, including different companies. It should be appreciated that the retail store may facilitate the import or update at any time. Similarly, the processing server 115 may push the imported or updated information to the electronic device 105 and/or the POS system 110, and/or the electronic device 105 and/or the POS system 110 may pull the imported or updated information from the processing server 115. Accordingly, the electronic device 105 and/or the POS system 110 may maintain and/or access updated item information.

In operation, when the user 103 is ready to complete a checkout for the set of items 106, the user 104 may use either the POS system 110 or electronic device 105 to initiate a checkout. The electronic device 105 may prompt the user 104 to annunciate or speak an identification of each item in the set of items 106. A microphone of the electronic device 105 may detect the speech, and the electronic device 105 may analyze the speech to determine a set of keywords included in the speech. Further, the electronic device 105 may identify a set of items that match the set of keywords, and may display, via a user interface, the set of matching items along with an identification (e.g., a UPC or PLU) of each of the set of matching items. The user 104 may interface with the POS system 110 via the user interface to input the identification of a desired matching item, where the POS system 110 may add the inputted item to a checkout order. Additional details and functionalities associated with these components are described further with respect to FIG. 2.

Figure 2:
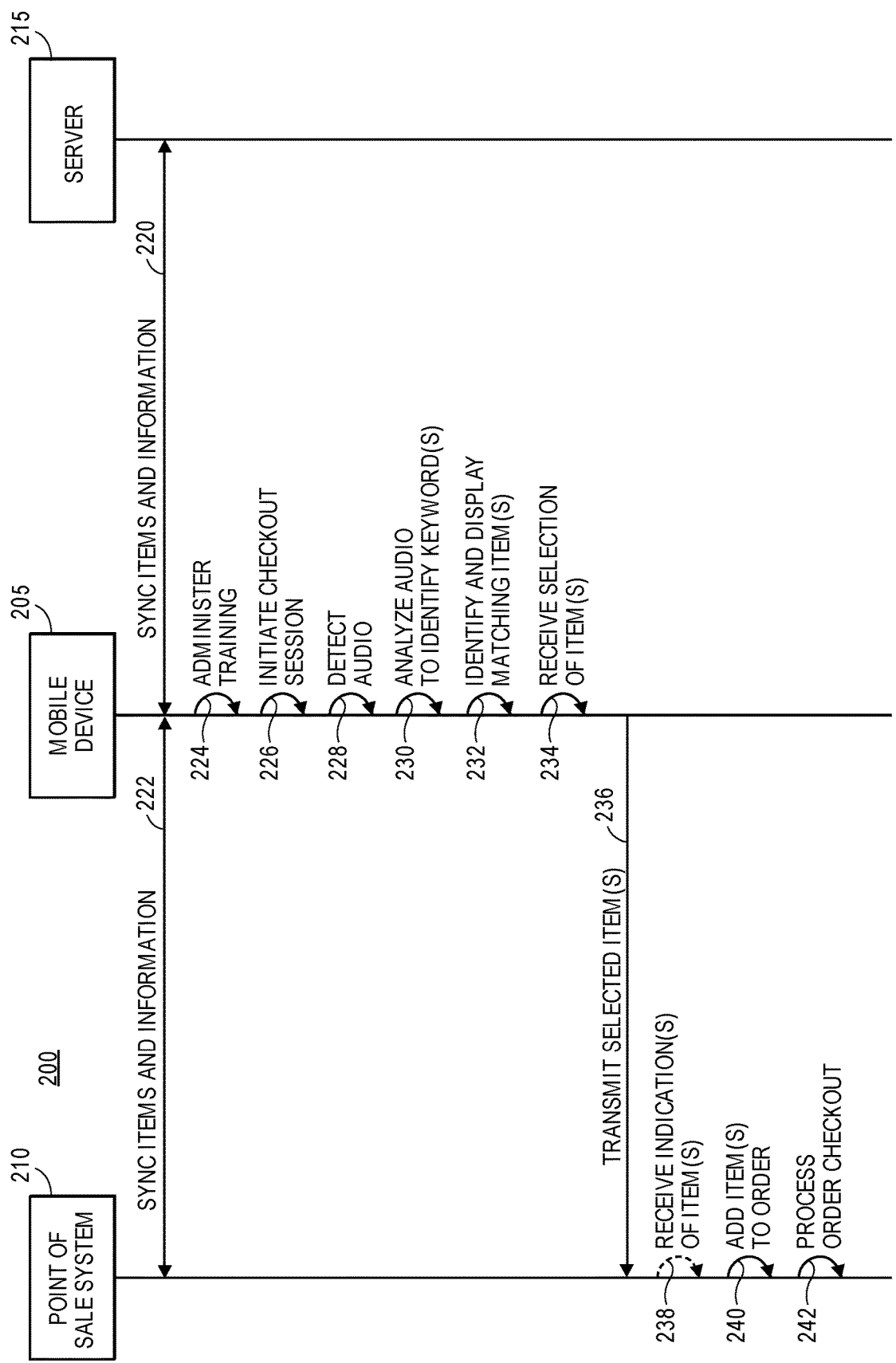
FIG. 2 depicts an example signal diagram associated with implementing speech recognition technologies into retail store checkouts, in accordance with some embodiments.

FIG. 2 depicts a signal diagram 200 associated with facilitating a store checkout using speech recognition technologies. The signal diagram 200 includes a point of sale (POS) system 210 (such as the POS system 110 as discussed with respect to FIG. 1), a mobile device 205 (such as the mobile device 105 as discussed with respect to FIG. 1), and a server 215 (such as the server 115 as discussed with respect to FIG. 1). The point of sale system 210 and the mobile device 205 may be located in a retail store, and may be operated autonomously or by an individual in association with a checkout procedure. The server 215 may be located within the retail store or may be located remotely from the retail store, and may be configured to communicate with either or both of the point of sale system 210 and the mobile device 205. Each of the mobile device 205 and the POS system 210 may be configured to implement and execute one or more applications configured to facilitate the respective described functionalities.

The signal diagram 200 may begin when the server 215 initiates (220) a synchronization of items and information with the mobile device 205. In particular, the server 215 may manage, in real-time or near-real time, an inventory of items for sale in the retail store, where the synchronization may reflect the inventory of items. As a result, the server 215 may provide the mobile device 205 with an accurate inventory of the products for sale in the retail store as well as information associated with the products. For example, the information may include price (e.g., flat price per item or price per unit weight), sale information (e.g., sale price or sale effective dates), a PLU, a location of the item within the store, an image(s) of the item, a description of the item, and/or other information. According to embodiments, the server 215 may initiate the synchronization automatically (e.g., in response to obtaining updated inventory data), periodically (e.g., once/day), or in response to a request from the mobile device 205 or another component.

Additionally or alternatively, the server 215 may initiate (222) a synchronization of items and information with the POS system 210. In one implementation, the server 215 may synchronize directly with the POS system 210. In another implementation, the server 215 may synchronize indirectly with the POS system 210 via the mobile device 205. In either implementation, the server 205 may provide to the POS system 210 the same information (or different information) that the server 215 provides to the mobile device 205 in the synchronization of (220).

The mobile device 205 may administer (224) a training with a user of the mobile device 205. In embodiments, the mobile device 205 may administer the training independently from any synchronization with the server 215. Further, the mobile device 205 may repeatedly administer the training to the same user, or to additional users. It should be appreciated that the mobile device 205 may locally administer the training, or may interface with the server 215 (e.g., via a website) to initiate and administer the training.

In an implementation, the training may be designed to calibrate or analyze a user's voice and/or speech patterns. In operation, the training may instruct the user to recite a set of words or phrases that the mobile device 205 may detect via a built-in or external microphone. The mobile device 205 may further analyze the detected words or phrases to establish a baseline associated with the user's voice and/or speech patterns, which the mobile device 205 may use in subsequent analyses of the user's speech. In an implementation, the mobile device 205 may send data associated with the training to the server 215 for storage thereon. It should be appreciated that the mobile device 205 may administer, assess, compile, and analyze the training functionalities according to any technique, calculation, algorithm, and/or the like.

The mobile device 205 may initiate (226) a checkout session, which may be independent from administration of the training. In embodiments, the mobile device 205 may initiate the checkout session when a customer associated with the retail store wishes to purchase items offered in the retail store. The mobile device 205 may automatically initiate the checkout session in response to a trigger (e.g., a completion of a previous checkout session) or a user of the mobile device 205 may manually initiate the checkout session. In an implementation, the POS system 210 may send a signal or command to the mobile device 205 to initiate the checkout session. According to embodiments, in initiating the checkout session, the mobile device 205 may instruct the user to annunciate or speak identifications of items that the customer desires to purchase. In an implementation, the customer him/herself may initiate and conduct the checkout session without assistance from the user.

The mobile device 205 may detect (228) audio or speech of the user indicative of the items for purchase. In particular, the mobile device 205 may detect the audio or speech via a microphone, such as an integrated microphone or a peripheral microphone (e.g., in a headset). In embodiments, the mobile device 205 may instruct or guide the user in annunciating or speaking the words so that the user may know when to annunciate or speak.

The mobile device 205 may analyze (230) the detected audio to identify a set of keywords included in the detected audio. It should be appreciated that the mobile device 205 may utilize any type of speech recognition (SR) technology, algorithm, or the like in analyzing the detected audio. For example, the mobile device 205 may utilize a hidden Markov model (HMM), dynamic time warping (DTW), artificial neural network(s), deep feedforward and recurrent neural networks, end-to-end automatic speech recognition, and/or other techniques. In analyzing the detected audio, the mobile device 205 may utilize any data associated with the training of the user. In particular, the mobile device 205 may utilize the baseline information associated with the speech of the user, which may result in a more accurate speech recognition (i.e., more accurate identified set of keywords). In an implementation, the mobile device 205 may transmit the detected audio data to the server 215, the server 215 may analyze the detected audio, and the server 215 may transmit the identified set of keywords to the mobile device 205.

In an additional or alternative implementation, the mobile device 205 may capture, or receive as input, image data that may depict an item(s) for purchase. In particular, the mobile device 205 may include or may interface with a set of image sensors configured to capture a set of image data depicting the item(s). For example, the set of image sensors may be disposed in proximity to a checkout location in a retail store. Accordingly, the mobile device 205 may analyze the set of image data according to various calculations or techniques to identify the item(s) that may be depicted in the set of image data. The mobile device 205 may use various computer vision techniques, including optical character recognition (OCR), object recognition, and other techniques. Additionally or alternatively, the mobile device 205 may support text to speech functionalities, where the mobile device 205 may annunciate an inputted text string, such as if the user does not know how to pronounce a certain item.

The mobile device 205 may identify and display (232) item(s) that match the set of keywords. According to embodiments, the mobile device 205 may facilitate a query against any stored inventory information (or other stored information) and using the set of keywords to identify the matching item(s). It should be appreciated that the mobile device 205 may employ any type of query according to any technique or algorithm. In an embodiment, the mobile device 205 may enable the user to select one or more filters that the mobile device 205 may use in its query. For example, the filters may specify produce versus non-produce, favorites, color, size, geography, best sellers, seasonal, source of origin, organic, gluten free, location within store, and/or other filters. It should be appreciated that the mobile device 205 may perform the query locally, or may interface with the server 215 to perform the query.

The mobile device 205 may present information associated with the matching item(s) in a user interface. In particular, the mobile device 205 may present, for each matching item(s), an identification of the item, an image of the item, a description of the item, pricing information, a PLU or other code associated with the item, and/or other relevant information. In an embodiment, the user may select, via the interface, to view more information associated with a particular item. In an embodiment, the mobile device 205 may identify a respective popularity of each of the matching item(s), and may rearrange the matching item(s) based on the popularity(ies).

In an implementation, the mobile device 205 may receive (234) a selection of one of the matching item(s), where the user may select the item via the user interface of the mobile device 205. In embodiments, the mobile device 205 may receive the selection via a touch selection by a user, via a voice command from the user, via a peripheral component (e.g., a keyboard) or via another channel. The user may additionally use the mobile device 205 to input or select information associated with the selected item, such as a weight of the selected item, a quantity of the selected item, and/or additional information. In an implementation, the mobile device 205 may generate or identify a set of keywords to be used in item queries based on various selections by the user, such as item selections, filter selections, and/or the like, which the application may use in subsequent queries.

After the mobile device 205 receives the selection, the mobile device 205 may transmit (236) an indication(s) of the selected item(s) to the POS system 210. The mobile device 205 may also transmit any additional information inputted by the user (e.g., a weight or quantity of the selected items). In embodiments, the indication(s) of the selected item(s) may be in the form of an identification (e.g., a unique code such as a PLU) associated with the selected item(s).

In an alternative or additional implementation, the POS system 210 may receive (238) an indication(s) of an item(s). In this implementation, the user may interface with the POS system 210 to input an identification (e.g., a unique code such as a PLU) associated with an item(s), where the item(s) may be one of the matching items(s) displayed by the mobile device 205 and where the identification may be displayed with the corresponding matching item by the mobile device 205. Thus, the user of the mobile device 205 may reference the matching item and its identification in association with inputting the identification into the POS system 210. In embodiments, the user may input the indication(s) of the item(s) via a user interface of the POS system 210, such as by using a touch screen, reciting a voice command, using a peripheral component (e.g., a keyboard), or via another channel.

The POS system 210 may add (240) any inputted or selected item(s) to the order. In particular, the POS system 210 may add, to the order, any item(s) indicated in communications from the mobile device 205. The POS system 210 may interface with a scale to receive a weight of an inputted or selected item(s), and may manage or modify the order according to the received weight. After all items have been added to the order, the POS system 210 may process (242) a checkout of the order. In particular, the POS system 210 may receive an indication that the order is complete, and may facilitate payment of the order by the customer, providing of a receipt to the customer, and/or other functionalities.

The electronic device 205 may continuously or periodically provide or display notifications that may indicate a progress or performance of the user. For example, the notifications may indicate areas of improvement (e.g., displaying images of cilantro and parsley and highlighting differences thereof), or may provide positive reinforcement (e.g., "great job identifying the tomatillos!").

Figure 3:
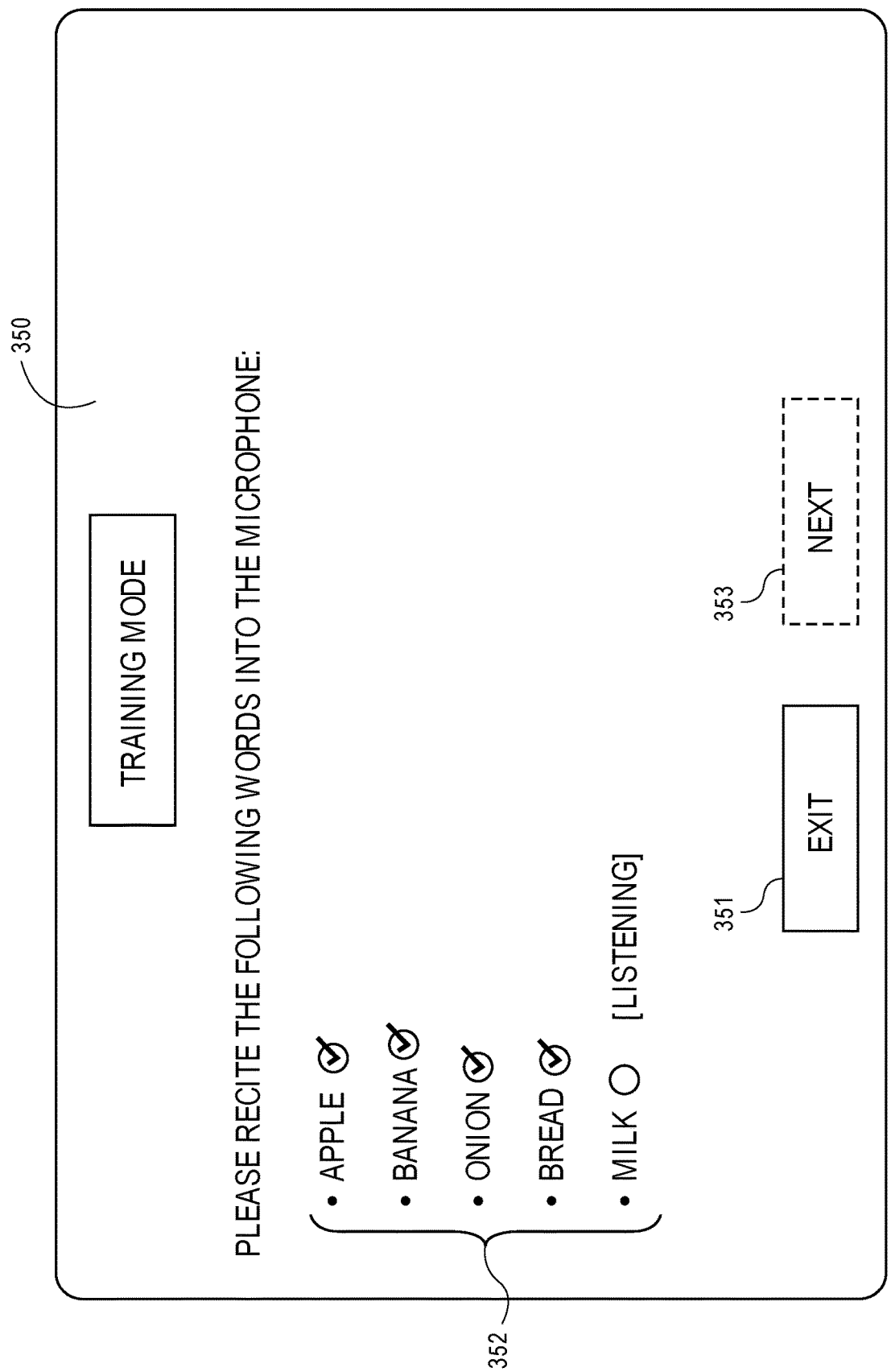
FIG. 3 depicts an example user interface associated with a training mode of an application, in accordance with some embodiments.
Figure 4:
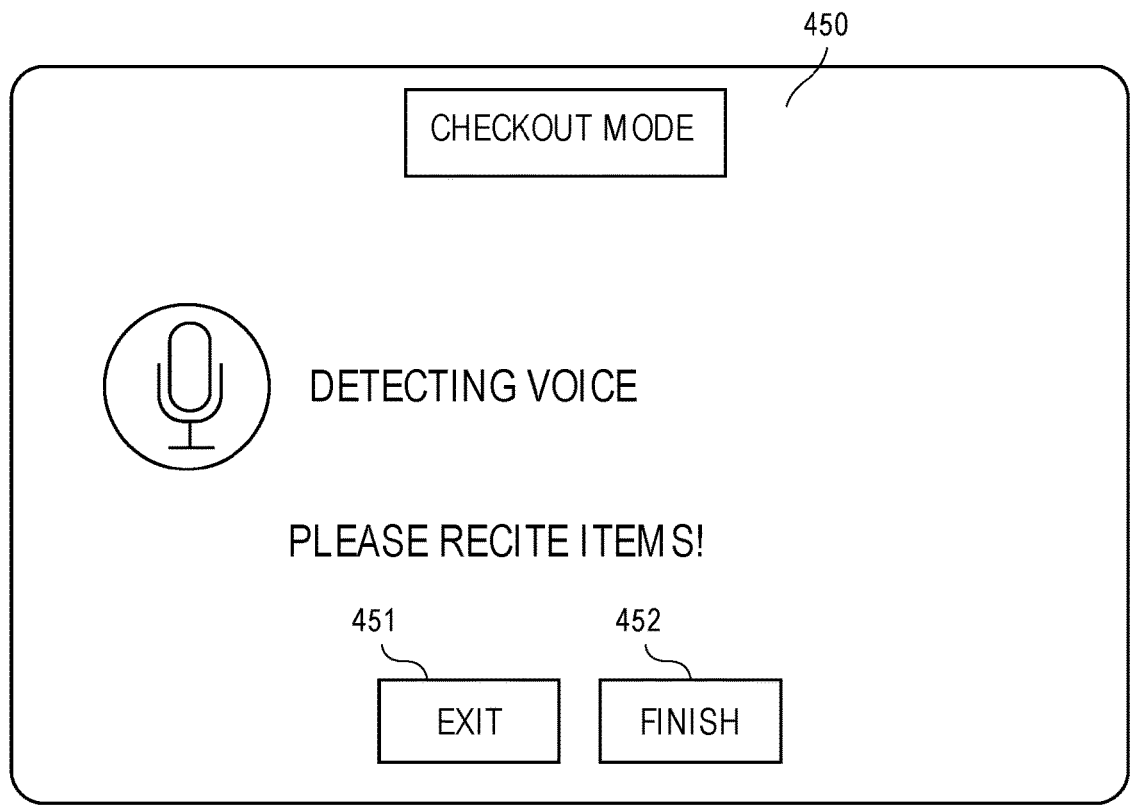
FIGS. 4 and 5 depict example user interfaces associated with a checkout mode of an application, in accordance with some embodiments
Figure 5:
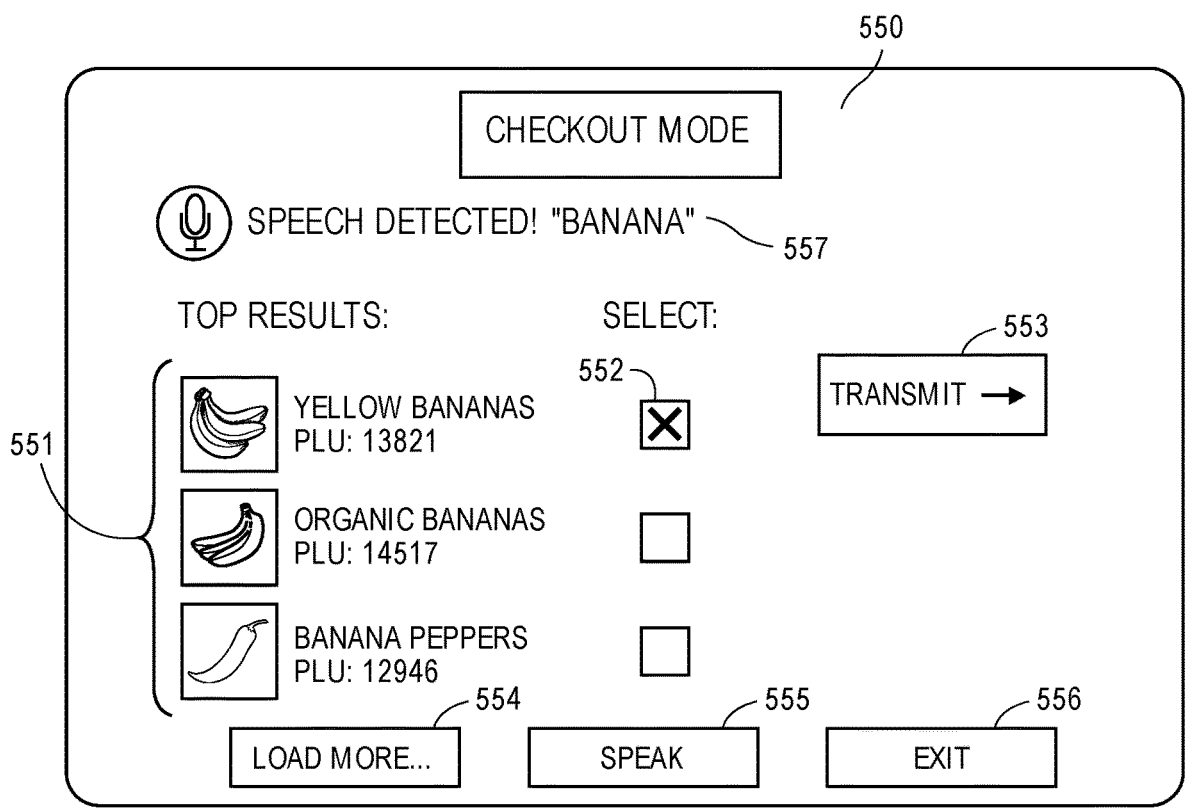

FIGS. 3-5 illustrate example interfaces associated with the systems and methods. An electronic device (e.g., a mobile device such as a tablet, a POS system, etc.) may be configured to display the interfaces and/or receive selections and inputs via the interfaces, where the electronic device may be associated with a retail store. One or more dedicated applications that are configured to operate on the electronic device may display the interfaces. It should be appreciated that the interfaces are merely examples and that alternative or additional content is envisioned.

FIG. 3 illustrates an interface 350 depicting a training mode for an application. In embodiments, a user of the electronic device (e.g., a cashier) may initiate the training mode that may be designed to record and establish a baseline for the user's voice or speech. The interface 350 may direct the user to recite a set of words 352 (as shown: apple, banana, onion, bread, milk). A microphone associated with the electronic device may detect the set of words 352 in succession and the interface 350 may display an updated status of the detection. In particular, as shown in FIG. 3, the interface 350 indicates, via a set of check marks, that the electronic device has detected the words "apple," "banana," "onion," and "bread." Further, the interface 350 indicates that the electronic device is listening for the word "milk."

The interface 350 may further include an "exit" selection 351 that, upon selection, may cause the application to exit the training mode. Further, the interface 350 may include a "next" selection 353 that, upon selection, may cause the application to proceed to additional functionality. The interface 350 depicts that the "next" selection 353 as dashed, where the "next" selection 353 may transition to selectable when the electronic device detects all words included in the set of words 352.

FIG. 4 illustrates an interface 450 depicting a checkout mode for the application. According to embodiments, the checkout mode may be associated with a customer purchasing a set of items from the retail store. In embodiments, the checkout mode and the training mode may be associated with the same application or different applications. As shown in FIG. 4, the interface 450 may instruct the user (e.g., a cashier) to recite the items that the customer is purchasing. Further, the interface 450 indicates that the electronic device is detecting the user's voice, such as via a microphone. The interface 450 may include an "exit" selection 451 that, upon selection, may cause the application to exit the checkout mode. The interface 450 may further include a "finish" selection 452 that, upon selection, may cause the application to initiate a set of functionalities related to completion of the checkout.

FIG. 5 illustrates another interface 550 depicting the checkout mode for the application. According to embodiments, the application may display the interface 550 after detecting and analyzing a user's voice. In particular, the application may display the interface 550 after identifying a set of keywords in the captured audio and determining a set of matching items based on the set of keywords.

As shown in FIG. 5, the interface 550 may indicate (557) that the word "banana" was detected. Accordingly, the interface 550 may include a set of matching items 551, including "yellow bananas," "organic bananas," and "banana peppers." The set of matching items 551 further includes a set of information associated with each matching item (as shown: an image and a PLU). The interface 550 may enable the user to select a desired item(s) from the set of matching items (as shown the user selects (552) "yellow bananas"). It should be appreciated that other options (e.g., quantity selection, weight input) are envisioned. The interface 550 may include a "load more" selection 554 that, upon selection, may cause the application to display additional matching item(s).

The interface 550 may further include a "speak" selection 555 that, upon selection, may cause the application to display the interface 450 of FIG. 4 and detect additional audio. Additionally, the interface 550 may include an "exit" selection 556 that, upon selection, may cause the electronic device to exit the interface 550 and any associated functionality.

In an implementation, the interface 550 may include a "transmit" selection 553 that, upon selection, may cause the electronic device to transmit an indication of the selected item to another component, such as a POS system. In this embodiment, the POS system may receive the indication and may add the selected item to the checkout order. In another implementation, the user may interface with the POS system (or similar component) and input an identification of a desired item. For example, the user may notice that the customer wishes to purchase organic peppers having a PLU of 14517, and may input this PLU into the POS system.

Figure 6:
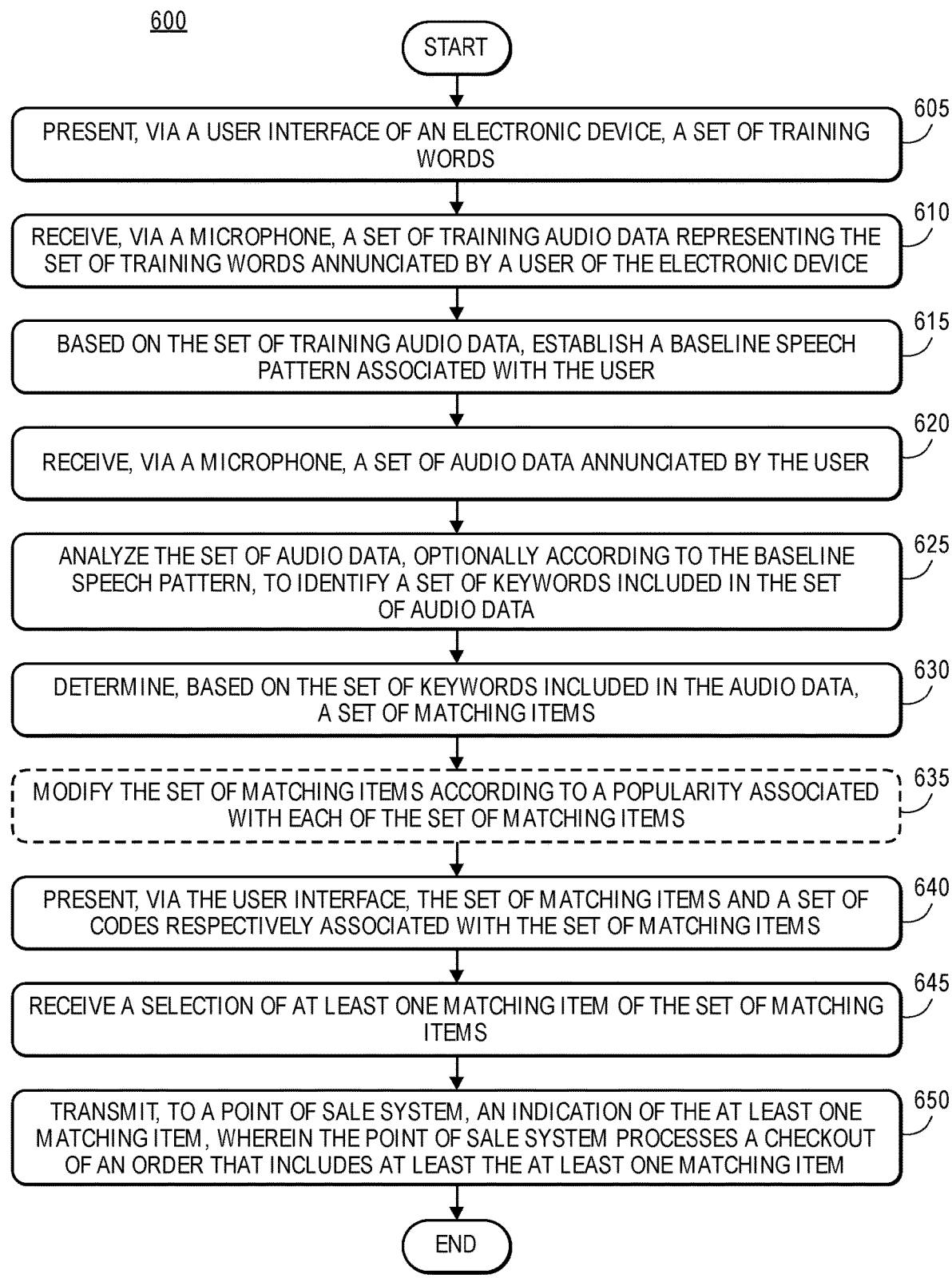
FIG. 6 depicts an example flow diagram associated with facilitating a checkout for items to be purchased, in accordance with some embodiments.

FIG. 6 depicts is a block diagram of an example method 600 of facilitating a checkout for items to be purchased. The method 600 may be facilitated by an electronic device (such as the mobile device 205 as discussed with respect to FIG. 2) that may be incorporated within or capable of communication with a POS system (such as the POS system 210 as discussed with respect to FIG. 2).

The method 600 may begin when the electronic device optionally initiates a training mode or feature for a user of the electronic device. In particular, the electronic device may present (block 605), via a user interface of the electronic device, a set of training words. In embodiments, the electronic device may instruct the user to recite or annunciate the set of training words. The electronic device may receive (block 610), via a microphone, a set of training audio data representing the set of training words annunciated by the user of the electronic device. Based on the set of training audio data, the electronic device may establish (block 615) a baseline speech pattern associated with the user. In embodiments, the electronic device may locally store the baseline speech pattern or cause an external device or server to store the baseline speech pattern.

Separate from the functionalities of the training mode, the electronic device may initiate a checkout procedure associated with a customer purchasing a set of items. Thus, the electronic device may activate any speech recognition features and accordingly the electronic device may receive (block 620), from a microphone, a set of audio data annunciated by the user, where the set of audio data may correspond to one or more of the set of items to be purchased. The electronic device may analyze (block 625) the set of audio data to identify a set of keywords included in the set of audio data. In an embodiment, the electronic device may analyze the set of audio data according to the baseline speech pattern of the user. It should be appreciated that the electronic device may employ any technique, algorithm, calculation, and/or the like in analyzing the set of audio data.

The electronic device may determine (block 630), based on the set of keywords included in the audio data, a set of matching items. In embodiments, the electronic device may perform a query using the set of keywords, where the set of matching items may be returned from the query based on at least one of the set of keywords being included in each of the set of matching items. In an implementation, the electronic device may interface with another local or remote device, server, or component to perform the query. In an optional implementation, the electronic device may modify (block 635) the set of matching items according to a popularity associated with each of the set of matching items. In particular, the electronic device may rearrange an ordering of the set of matching items according to a popularity of the set of matching items.

The electronic device may present (block 640), via the user interface, the set of matching items and a set of codes respectively associated with the set of matching items. In embodiments, the electronic device may also present additional information associated with the set of matching items, including a set of images and/or various item descriptions. The electronic device may receive (block 645) a selection of at least one matching item of the set of matching items. In an embodiment, the electronic device may receive the selection via a touch-sensitive surface of a user interface. In another embodiment, in receiving the selection, the electronic device may receive an additional set of audio data via the microphone, and may analyze the additional set of audio data to identify the at least one matching item included in the additional set of audio data.

The electronic device may transmit (block 650), to a point of sale system, an indication of the at least one matching item, where the point of sale system may process a checkout of an order that includes at least the at least one matching item. In embodiments, the electronic device may transmit the indication to the point of sale system via any type of network connection. In an implementation, as discussed herein, the user may interface with the point of sale system to input the indication of the at least one matching item, and the point of sale system may complete the checkout accordingly.

Figure 7:
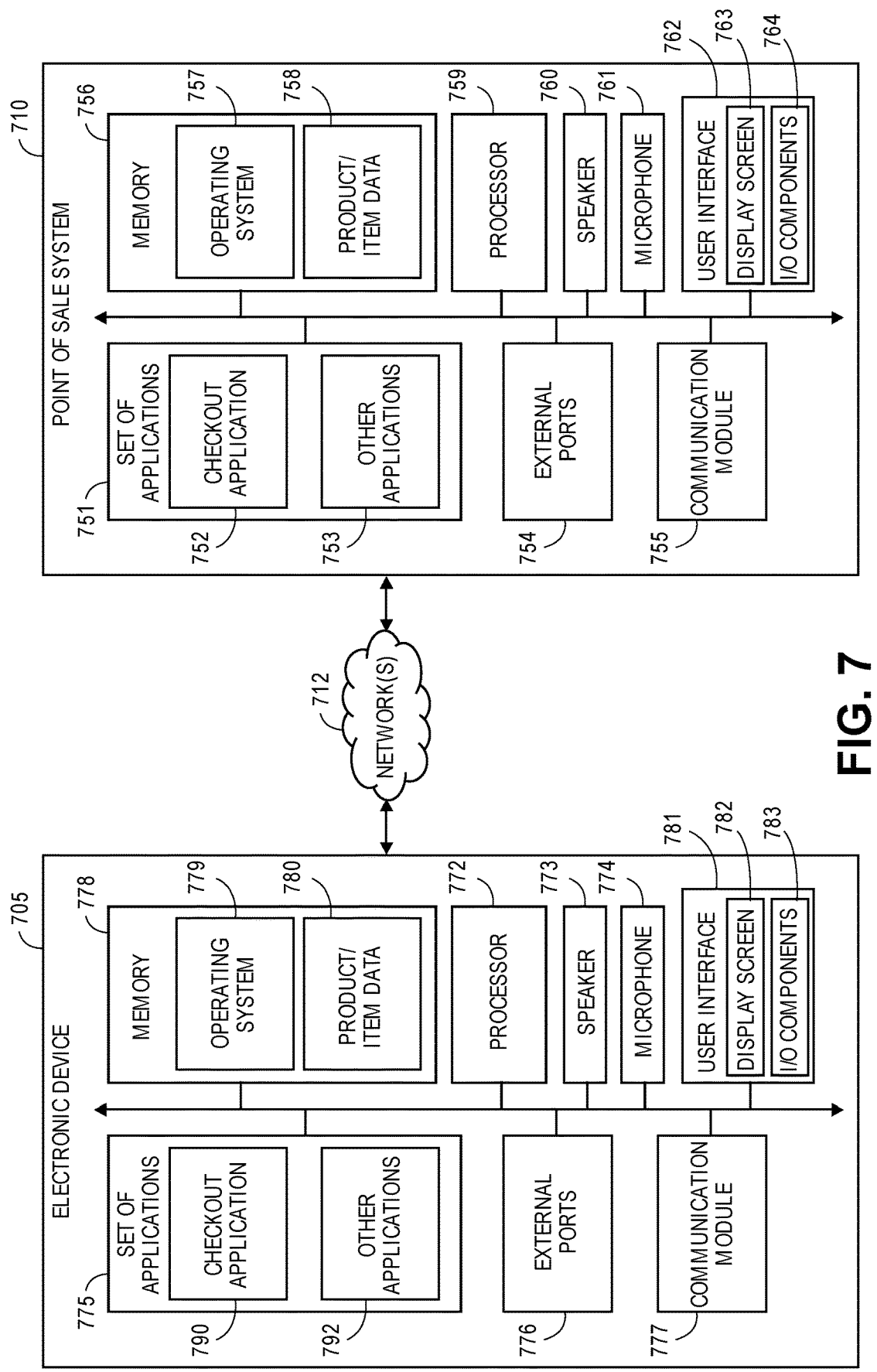
FIG. 7 is a hardware diagram of an example electronic device and example POS system, in accordance with some embodiments.

FIG. 7 illustrates a hardware diagram of an example electronic device 705 (such as the mobile device 205 as discussed with respect to FIG. 2) and an example POS system 710 (such as the POS system 210 as discussed with respect to FIG. 2), in which the functionalities as discussed herein may be implemented. It should be appreciated that the electronic device 705 and the POS system 710 may be associated with a retail store having available a set of items for purchase by customers. It should be appreciated that the electronic device 705 and the POS system 710 may be combined into a single device.

The electronic device 705 may include a processor 772 as well as a memory 778. The memory 778 may store an operating system 779 capable of facilitating the functionalities as discussed herein as well as a set of applications 775 (i.e., machine readable instructions). For example, one of the set of applications 775 may be a checkout application 790 configured to facilitate speech recognition technologies in an order checkout. It should be appreciated that one or more other applications 792 are envisioned, such as a speech recognition training application.

The processor 772 may interface with the memory 778 to execute the operating system 779 and the set of applications 775. According to some embodiments, the memory 778 may also include product or item data 780 including data or information associated with a set of items for sale in a retail store. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 705 may further include a communication module 777 configured to communicate data via one or more networks 712. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, from a backend server via the network 712, information related to inventory and pricing updates. For further example, the communication module 777 may transmit, to the backend server via the network 712, captured audio data for analysis by the backend server.

The electronic device 705 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs). According to some embodiments, the user may access the electronic device 705 via the user interface 781 to review information, make selections, and/or perform other functions. Additionally, the electronic device 705 may include a speaker 773 configured to output audio data and a microphone 774 configured to detect audio.

In some embodiments, the electronic device 705 may perform the functionalities as discussed herein as part of a "cloud" network or may otherwise communicate with other hardware or software components within the cloud to send, retrieve, or otherwise analyze data.

As illustrated in FIG. 7, the electronic device 705 may communicate and interface with the POS system 710 via the network(s) 712. The POS system 710 may include a processor 759 as well as a memory 756. The memory 756 may store an operating system 757 capable of facilitating the functionalities as discussed herein as well as a set of applications 751 (i.e., machine readable instructions). For example, one of the set of applications 751 may be a checkout application 752 configured to facilitate an order checkout. It should be appreciated that one or more other applications 753 are envisioned.

The processor 759 may interface with the memory 756 to execute the operating system 757 and the set of applications 751. According to some embodiments, the memory 756 may also include product or item data 758 including data or information associated with a set of items for sale in a retail store. The memory 756 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The POS system 710 may further include a communication module 755 configured to communicate data via the one or more networks 712. According to some embodiments, the communication module 755 may include one or more transceivers (e.g., WWAN, WLAN, and/or WPAN transceivers) functioning in accordance with IEEE standards, 3GPP standards, or other standards, and configured to receive and transmit data via one or more external ports 754. For example, the communication module 755 may receive, from the electronic device 705, identifications of items to add to an order.

The POS system 710 may further include a user interface 762 configured to present information to a user and/or receive inputs from the user. As shown in FIG. 7, the user interface 762 may include a display screen 763 and I/O components 764 (e.g., ports, capacitive or resistive touch sensitive input panels, keys, buttons, lights, LEDs). According to some embodiments, the user may access the POS system 710 via the user interface 762 to review information, make selections (e.g., input items), facilitate payment from a customer, and/or perform other functions. Additionally, the POS system 710 may include a speaker 760 configured to output audio data and a microphone 761 configured to detect audio.

In some embodiments, the POS system 710 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 772, 759 (e.g., working in connection with the respective operating systems 779, 757) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of facilitating a checkout for items to be purchased, the method comprising:
   receiving, via a microphone, a set of audio data annunciated by a user of the electronic device;
   analyzing, by a processor, the set of audio data to identify a set of keywords included in the set of audio data;
   determining, based on the set of keywords included in the set of audio data, a set of matching items;
   presenting, via a user interface of the electronic device, the set of matching items;
   receiving, via the user interface, a selection of at least one matching item of the set of matching items; and
   after receiving the selection of the at least one matching item, directly transmitting, from the electronic device to a point of sale system via a short-range communication, an indication of the at least one matching item, wherein the point of sale system (i) adds the at least one matching item to an order, and (ii) processes a checkout of the order that includes the at least one matching item.

2. The computer-implemented method of claim 1, wherein receiving, via the user interface, the selection of the at least one matching item of the set of matching items comprises:
   receiving, via a touch-sensitive surface of the user interface, the selection of the at least one matching item of the set of matching items.

3. The computer-implemented method of claim 1, wherein receiving, via the user interface, the selection of the at least one matching item of the set of matching items comprises:
   receiving an additional set of audio data via the microphone; and
   analyzing the additional set of audio data to identify the at least one matching item included in the additional set of audio data.

4. The computer-implemented method of claim 1, wherein presenting, via the user interface of the electronic device, the set of matching items comprises:
   presenting, via the user interface, (i) the set of matching items, and (ii) a set of codes respectively associated with the set of matching items.

5. The computer-implemented method of claim 1, further comprising:
   presenting, via the user interface, a set of training words;
   receiving, via the microphone, a set of additional audio data representing the set of training words annunciated by the user; and
   based on the set of additional audio data, establishing a baseline speech pattern associated with the user.

6. The computer-implemented method of claim 5, wherein analyzing the set of audio data to identify the set of keywords included in the set of audio data comprises:
   analyzing the set of audio data according to the baseline speech pattern associated with the user to identify the set of keywords included in the set of audio data.

7. The computer-implemented method of claim 1, wherein presenting, via the user interface of the electronic device, the set of matching items comprises:
   modifying the set of matching items according to a popularity associated with each of the set of matching items; and
   presenting, via the user interface of the electronic device, the set of matching items that was modified.

8. An electronic device for facilitating a checkout for items to be purchased, comprising:
   a memory storing a set of computer-executable instructions;
   a user interface;
   a transceiver in direct communication with a point of sale system via a short-range communication; and
   a processor interfacing with the memory, the user interface, and the transceiver, and configured to execute the set of computer-executable instructions to cause the processor to:
      receive, via a microphone, a set of audio data annunciated by a user of the electronic device,
      analyze the set of audio data to identify a set of keywords included in the set of audio data,
      determine, based on the set of keywords included in the set of audio data, a set of matching items,
      cause the user interface to present the set of matching items,
      receive, via the user interface, a selection of at least one matching item of the set of matching items, and
      after receiving the selection of the at least one matching item, directly transmit, from the electronic device to the point of sale system via the short-range communication established by the transceiver, an indication of the at least one matching item, wherein the point of sale system (i) adds the at least one matching item to an order, and (ii) processes a checkout of the order that includes the at least one matching item.

9. The electronic device of claim 8, wherein the user interface comprises a touch-sensitive surface, and wherein to receive, via the user interface, the selection of the at least one matching item of the set of matching items, the processor is configured to:
   receive, via the touch-sensitive surface of the user interface, the selection of the at least one matching item of the set of matching items.

10. The electronic device of claim 8, wherein to receive, via the user interface, the selection of the at least one matching item of the set of matching items, the processor is configured to:
   receive a set of additional audio data via the microphone, and
   analyze the set of additional audio data to identify the at least one matching item included in the set of additional audio data.

11. The electronic device of claim 8, wherein to cause the user interface to present the set of matching items comprises:
   cause the user interface to present (i) the set of matching items, and (ii) a set of codes respectively associated with the set of matching items.

12. The electronic device of claim 8, wherein the processor is configured to execute the set of computer-executable instructions to further cause the processor to:
   cause the user interface to present a set of training words,
   receive, via the microphone, a set of additional audio data representing the set of training words annunciated by the user, and
   based on the set of additional audio data, establish a baseline speech pattern associated with the user.

13. The electronic device of claim 12, wherein to analyze the set of audio data to identify the set of keywords included in the set of audio data, the processor is configured to:
   analyze the set of audio data according to the baseline speech pattern associated with the user to identify the set of keywords included in the set of audio data.

14. The electronic device of claim 8, wherein the processor is further configured to:
   modify the set of matching items according to a popularity associated with each of the set of matching items, and
   cause the user interface to present the set of matching items that was modified.

15. A system for facilitating a checkout for items to be purchased, comprising:
   a mobile device comprising:
      a first memory storing a first set of computer-executable instructions,
      a user interface, and
      a first processor interfacing with the first memory and the user interface, and configured to execute the first set of computer-executable instructions to cause the first processor to:
         receive a set of audio data from a user via a microphone, analyze the set of audio data to identify a set of keywords included in the set of audio data, determine, based on the set of keywords included in the set of audio data, a set of matching items, and cause the user interface to present (i) the set of matching items, and (ii) a set of codes respectively associated with the set of matching items, receive, via the user interface, a selection of at least one matching item of the set of matching items, and after receiving the selection of the at least one matching item directly transmit, to a point of sale device via a short-range communication, at least one code of the set of codes respectively corresponding to the at least one matching item of the set of matching items; and the point of sale device comprising:

a second memory storing a second set of computer-executable instructions, and a second processor interfacing with the second memory and configured to execute the second set of computer-executable instructions to cause the second processor to:

receive, from the mobile device, the at least one code of the set of codes respectively corresponding to the at least one matching item of the set of matching items, add the at least one matching item to an order, and process a checkout of the order that includes the at least one matching item.

16. The system of claim 15, wherein the first processor is configured to execute the first set of computer-executable instructions to further cause the first processor to:

cause the user interface to present a set of training words, receive, via the microphone, a set of additional audio data representing the set of training words annunciated by the user, and based on the set of additional audio data, establish a baseline speech pattern associated with the user.

17. The system of claim 16, wherein to analyze the set of audio data to identify the set of keywords included in the set of audio data, the first processor is configured to:

analyze the set of audio data according to the baseline speech pattern associated with the user to identify the set of keywords included in the set of audio data.

18. The system of claim 15, wherein to process the checkout of the order that includes the at least one matching item, the second processor is configured to:

receive an indication that the order is complete, and process a payment for the order.

19. The system of claim 15, wherein the point of sale device is configured to interface with a scale, and wherein the second processor is configured to execute the second set of computer-executable instructions to further cause the second processor to:

receive, from the scale, a weight of the at least one matching item, and manage the order based on the at least one matching item and the weight of the at least one matching item.

20. The system of claim 15, wherein the first processor is configured to execute the first set of computer-executable instructions to further cause the first processor to:

modify the set of matching items according to a popularity associated with each of the set of matching items, and cause the user interface to present the set of matching items that was modified.

* * * * *